Figure 1:
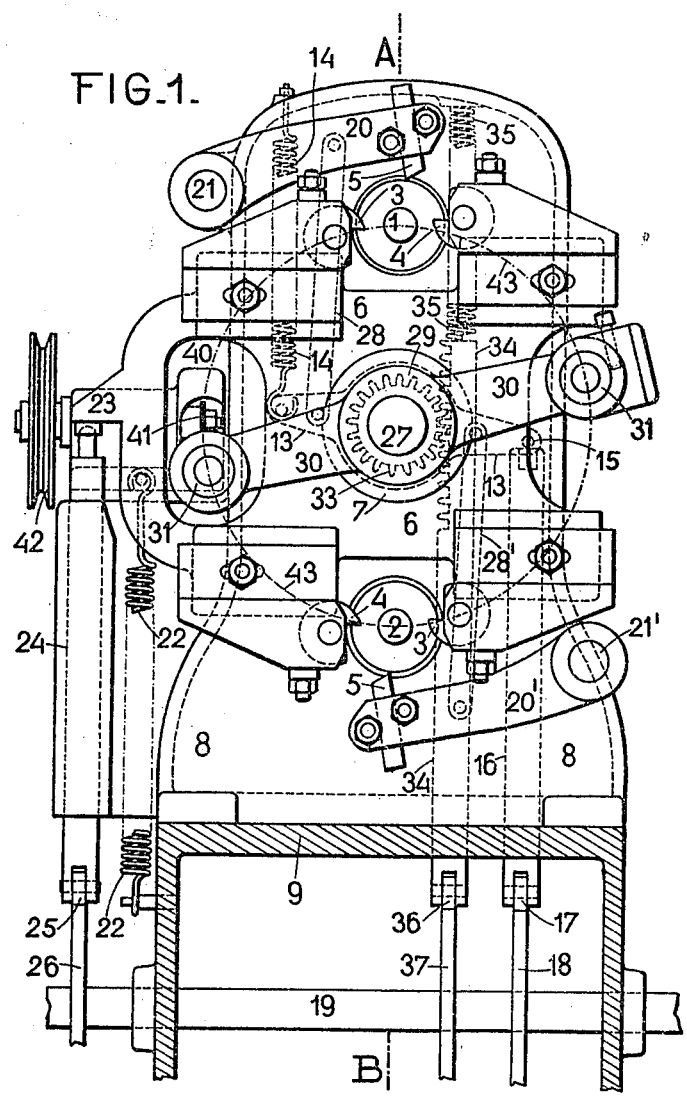

C. SANDOZ-MORITZ.
AUTOMATIC SCREW MAKING MACHINE.
APPLICATION FILED JUNE 20, 1917.

1,280,860.

Patented Oct. 8, 1918.
2 SHEETS—SHEET 1.

INVENTOR:
Charles Sandoz-Moritz
ATTY.

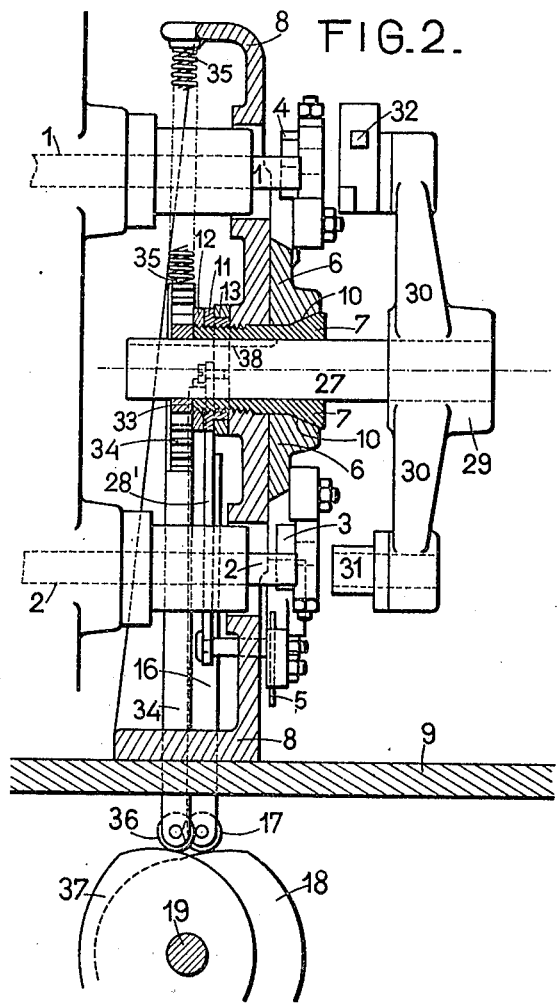

ured against the surface of a cam 37 keyed
UNITED STATES PATENT OFFICE.

CHARLES SANDOZ-MORITZ, OF TAVANNES, SWITZERLAND.

AUTOMATIC SCREW-MAKING MACHINE.

1,280,860. Specification of Letters Patent. Patented Oct. 8, 1918.

Application filed June 20, 1917. Serial No. 175,934.

*To all whom it may concern:*

Be it known that I, CHARLES SANDOZ-MORITZ, a citizen of the Swiss Republic, residing at Tavannes, Switzerland, have invented new and useful Improvements in Automatic Screw-Making Machines, of which the following is a specification.

The object of the present invention is an automatic machine tool comprising at least a pair of head-stock shafts simultaneously driven, and each supporting a piece of work combined with at least one tool, at least one of the tools being intended to operate on one of said pieces to be treated, being associated with a corresponding tool intended to operate on the other piece to be treated in such manner that the corresponding associated tools approach or recede simultaneously from their respective work to be treated.

In accordance with the invention each group of at least two associated tools is connected to a common rocking member controlled by the members of the machine and all these rocking members have a common center of oscillation, while one of them is adapted to operate as a transporting member to lead partially finished work to the tool intended to treat it subsequently.

The accompanying drawing shows by way of example one embodiment forming the subject of the invention.

In the drawing Figure 1 is a side elevation partly in section, Fig. 2 being a partial section on the line A—B of Fig. 1.

The automatic machine tool shown is intended for the production of set-screws with notched heads and comprises for this purpose stripping tools, cutting off tools, threading tools (not shown) and milling tools. It has two head-stock shafts which are disposed one above the other in the same vertical plane and each supports a metal bar or rod 1, 2 to be treated to which a rapid rotary movement is communicated. Moreover, by means of a known mechanism, not shown in the drawing, the bars or rods receive simultaneously automatically an advancing movement of such amount that the portions cut off by the stripping or roughing out tools are cut off from the bars. Each bar is subjected to treatment by three tools 3, 4, 5, which operate successively and of which the two first intended for stripping are mounted through the medium of regulating devices on a rocking member 6. This latter is adjusted freely on a bearing 7 and bearing against a shield 8 of the machine which is fixed to the frame 9. The bearing 7 is formed with a conical head 10 by means of which the rocking member 6 is maintained in place and at the side opposite the conical head there is formed a threaded portion with a nut 11 and a lock nut 12 by means of which the socket is held in place on the shield 8. Between the shield 8 and one face of the nut 11 is disposed a rocking member 13 freely adjusted on a socket on the nut 11. This rocking member comprises two diametrically opposite arms, the one connected to a spring 14 tending constantly to cause the rocking arm to turn so that the other arm acts through a pin 15 on a rod 16, the lower end of which provided with a roller 17 rests on the face of a cam 18 keyed on the cam shaft 19. Each arm of the rocking member 13 is connected by means of a connecting rod 28 or 28' with a lever 20 or 20' pivoted respectively at 21 and 21' and provided with a cutting off tool 5. The rocking member 6 is under the action of a spring 22 which tends always to cause a projection 23 of this rocking member to press against the upper end of a rod 24 the latter being provided at its lower end with a roller 25 pressing against the face of a cam 26 keyed on the shaft 19. In the bearing 7 is adjusted a shaft 27 on which is secured a rocking member 29 having two arms 30. Generally, each of the arms 30 is intended to receive a tool 32 which coöperates with the tools 3 and 4 in the work of stripping or roughing out the rods 1 and 2; however, the rocking member 29 may also operate as a feed means for leading each of the pieces treated preliminarily by the tools 3 and 4, threaded and cut off from the bars 1 and 2 toward a milling device provided for forming the notches in the screw heads. In this case, there is substituted for each of the tools 32 a socket 31 which serves for holding the work to be fed. The shaft 27 is driven by a pinion 33 keyed on the shaft 27 and meshing with a rack 34 against which acts a spring 35 so that the lower end of the rack provided with a roller 36 presses constantly against the surface of a cam 37 keyed on the shaft 19. The key by which the pinion 33 is keyed to the shaft 27 is fitted in a key-way 38 in the latter. This groove is made of sufficient length to permit the shaft to be displaced axially under the action of a controlling device, not shown. The machine comprises in addition two identical milling apparatus arranged symmetrically on opposite sides of the shaft 27. One only of these apparatus is shown in the drawing and it can be seen in Fig. 1 through an opening 40 in the rocking member 6; 41 is the milling tool, and 42 the driving pulley therefor. The milling tool 41 is disposed tangentially relatively to the curve of gyration which the work to be treated describes when brought in front of the milling tool by the member 29.

The machine operates substantially as follows: The cam 26 first raises the rod 24 which acts on the end 23 of the rocking member 6 and communicates to the latter an angular clock-wise movement against the action of the spring 22. As a result the corresponding tools 3 approach their respective pieces of work (bars or rods 1 and 2) and perform the work assigned to them. The rocking member 6 then oscillates in the opposite direction under the action of the spring 22 so that the tools 3 leave their respective pieces of work while the tools 4 approach the work in turn. The stumps of the bars or rods 1 and 2 which are now to be treated by the tools 3 and 4 are then introduced into the socket 31 of the rocking member 29, the socket at this moment being located axially of the rod 1 or 2 while the cam 18 acts through the medium of the rod 16 on the rocking member 13 and the connecting rods 28, 28' on the levers 20 or 20', the tools 5 on which cut the stripped stump of the respective rod. The screw threading operation which follows the stripping operation presents nothing particularly novel, and a detailed explanation is therefore not given. Finally, under the combined action of the cam 37 and of the spring 35, the rack 34 is displaced and acts on the pinion 33 in such manner that the member 29 swings through a quarter of a revolution and brings the pieces to be treated in front of their respective milling tools 41. By a slight axial movement of the shaft 27 the pieces of work to be treated are then brought into contact with their milling tools which produce the notch therein.

The machine tool may comprise more than a pair of head-stock shafts; the number of its tools may differ as well as their kind according to the work the machine is to perform. The associated tools connected to a common rocking member may generally number two or four as in the example shown in the drawing. However, in certain machines the number may be greater than four.

Having now particularly described and ascertained the nature of my said invention and in what manner the same is to be performed, I declare that what I claim is:

1. An automatic screw making machine comprising stripping means, cutting means conveying means, all of said means being mounted for rotary movement about a common center and biased to predetermined positions, and means for successively moving said means against their bias, in the order named, to other predetermined positions.

2. An automatic screw making machine comprising a shaft, a member mounted for rocking movement on said shaft, means upon opposite sides of said shaft for supporting pieces of work, severing tools carried by said member and arranged in pairs, the tools of each pair being arranged upon opposite sides of the adjacent work supporting means, means for biasing said member to a predetermined position, and means for actuating said member against said biasing means to cause the tools of each pair to alternately engage the work on said supporting means.

3. An automatic screw making machine as described in claim 2, a second member mounted for oscillatory movement on said shaft and biased to a predetermined position, stripping tools mounted exteriorly of the first member and operatively connected to the second member, and means for actuating the said second member to cause said stripping tools to alternately engage the work in said supporting means.

4. An automatic screw making machine as described in claim 3, conveying means receiving the work from said supporting means and mounted for oscillatory movement on said shaft, and means for actuating said conveying means in its proper sequence.

In testimony whereof I have signed my name to this specification in the presence of two subscribing witnesses.

CHARLES SANDOZ-MORITZ.

Witnesses:
H. KOELLIHER,
H. J. STELLIUS.

Copies of this patent may be obtained for five cents each, by addressing the "Commissioner of Patents, Washington, D. C."